United States Patent
Hakura et al.

(10) Patent No.: US 9,483,270 B2
(45) Date of Patent: Nov. 1, 2016

(54) DISTRIBUTED TILED CACHING

(71) Applicant: NVIDIA Corporation, Santa Clara, CA (US)

(72) Inventors: Ziyad S. Hakura, Gilroy, CA (US); Cynthia Ann Edgeworth Allison, Madison, AL (US); Dale L. Kirkland, Madison, AL (US); Walter R. Steiner, Flagler Beach, FL (US)

(73) Assignee: NVIDIA Corporation, Santa Clara, CA (US)

( * ) Notice: Subject to any disclaimer, the term of this patent is extended or adjusted under 35 U.S.C. 154(b) by 196 days.

(21) Appl. No.: 14/058,145

(22) Filed: Oct. 18, 2013

(65) Prior Publication Data

US 2014/0118361 A1    May 1, 2014

Related U.S. Application Data

(60) Provisional application No. 61/719,271, filed on Oct. 26, 2012.

(51) Int. Cl.
| | |
|---|---|
| *G06F 9/38* | (2006.01) |
| *G06T 15/00* | (2011.01) |
| *G06T 15/40* | (2011.01) |
| *G06T 1/20* | (2006.01) |

(Continued)

(52) U.S. Cl.
CPC . *G06F 9/38* (2013.01); *G06F 9/44* (2013.01); *G06F 12/0808* (2013.01); *G06F 12/0875* (2013.01); *G06T 1/20* (2013.01); *G06T 1/60* (2013.01); *G06T 15/005* (2013.01); *G06T 15/405* (2013.01); *G06T 15/503* (2013.01); *G06T 15/80* (2013.01); *G09G 5/003* (2013.01); *G09G 5/395* (2013.01); *G06F 2212/302* (2013.01); *Y02B 60/1225* (2013.01)

(58) Field of Classification Search
None
See application file for complete search history.

(56) References Cited

U.S. PATENT DOCUMENTS

| | | |
|---|---|---|
| 6,323,860 B1 | 11/2001 | Zhu et al. |
| 6,535,209 B1 | 3/2003 | Abdalla et al. |

(Continued)

OTHER PUBLICATIONS

Non-Final Office Action for U.S. Appl. No. 14/045,361 dated Feb. 26, 2016.

(Continued)

*Primary Examiner* — Mark Zimmerman
*Assistant Examiner* — Vu Nguyen
(74) *Attorney, Agent, or Firm* — Artegis Law Group, LLP

(57) ABSTRACT

One embodiment of the present invention sets forth a graphics subsystem configured to implement distributed tiled caching. The graphics subsystem includes one or more world-space pipelines, one or more screen-space pipelines, one or more tiling units, and a crossbar unit. Each world-space pipeline is implemented in a different processing entity and is coupled to a different tiling unit. Each screen-space pipeline is implemented in a different processing entity and is coupled to the crossbar unit. The tiling units are configured to receive primitives from the world-space pipelines, generate cache tile batches based on the primitives, and transmit the primitives to the screen-space pipelines. One advantage of the disclosed approach is that primitives are processed in application-programming-interface order in a highly parallel tiling architecture. Another advantage is that primitives are processed in cache tile order, which reduces memory bandwidth consumption and improves cache memory utilization.

20 Claims, 11 Drawing Sheets

(51) Int. Cl.
*G06T 1/60* (2006.01)
*G09G 5/395* (2006.01)
*G09G 5/00* (2006.01)
*G06T 15/50* (2011.01)
*G06F 12/08* (2016.01)
*G06F 9/44* (2006.01)
*G06T 15/80* (2011.01)

(56) References Cited

U.S. PATENT DOCUMENTS

| | | |
|---|---|---|
| 6,697,063 B1 | 2/2004 | Zhu et al. |
| 7,102,646 B1 | 9/2006 | Rubinstein et al. |
| 7,170,515 B1 | 1/2007 | Zhu et al. |
| 8,605,102 B1 | 12/2013 | Purcell et al. |
| 2009/0058848 A1 | 3/2009 | Howson |
| 2010/0169608 A1 | 7/2010 | Kuo et al. |
| 2011/0090220 A1* | 4/2011 | Molnar ........... G06T 15/005 345/420 |
| 2012/0229464 A1 | 9/2012 | Fishwick |

OTHER PUBLICATIONS

Non-Final Office Action for U.S. Appl. No. 14/046,249 dated May 10, 2016.

* cited by examiner

DISTRIBUTED TILED CACHING

CROSS-REFERENCE TO RELATED APPLICATIONS

This application claims benefit of U.S. provisional patent application Ser. No. 61/719,271, filed Oct. 26, 2012 and titled "An Approach for Tiled Caching." The subject matter of this related application is hereby incorporated herein by reference.

BACKGROUND OF THE INVENTION

1. Field of the Invention

Embodiments of the present invention relate generally to three-dimensional (3D) graphics processing, and, more particularly, to distributed tiled caching.

2. Description of the Related Art

A system for rendering three-dimensional graphics typically receives commands that are provided by an application programmer and processes the commands to generate pixels for a display. Such systems generally include a world-space pipeline and a screen-space pipeline. The world-space pipeline processes primitives and transmits the processed primitives to the screen-space pipeline. The screen-space pipeline receives the primitives and generates final pixels for display. The screen-space pipeline processes primitives in application-programming-interface (API) order so that final pixel values are produced as expected by the application programmer. More specifically, the outputs of various units within a screen-space pipeline depend on the order in which those units process received primitives. If primitives were to be processed in an incorrect order, then the outputs of the screen-space pipeline, such as final color values, would be not as expected by the application programmer. Therefore, in order to produce results that are as expected by the application programmer, the primitives are processed in an order ("API order") that is consistent with the commands provided by the application programmer.

Some graphics systems implement a tiling architecture in which a render target is divided into tiles. Work processed in such a graphics system is rearranged such that the work is processed in tile order. In other words, work associated with a first tile is processed first, then work associated with a second tile is processed, then work associated with a third tile, and so forth. Even with such architectures, work in the screen-space pipeline should be processed in API order for the reasons discussed above. Thus, a challenge when designing systems with tiling architectures is to configure the tiling unit and other units involved in generating the tile such that API order can be maintained in the screen-space pipeline.

In addition to the foregoing, more advanced tiling architectures may include multiple processing entities that are configured to implement different instances of a world-space pipeline and/or a screen-space pipeline. The sheer complexity of such highly parallel tiling architectures presents an even greater challenge to maintaining proper API order in the different screen-space pipelines.

As the foregoing illustrates, what is needed in the art is an approach for maintaining API order in the screen-space pipeline(s) of a highly parallel tiling architecture.

SUMMARY OF THE INVENTION

One embodiment of the present invention sets forth a graphics subsystem configured to implement distributed tiled caching. The graphics subsystem includes one or more world-space pipelines, one or more screen-space pipelines, one or more tiling units, and a crossbar unit. Each world-space pipeline is implemented in a different processing entity and is coupled to a different tiling unit. Each screen-space pipeline is implemented in a different processing entity and is coupled to the crossbar unit. The tiling units are configured to receive primitives from the world-space pipelines, generate cache tile batches based on the primitives, and transmit the primitives to the screen-space pipelines.

Another embodiment of the present invention sets forth a graphics subsystem configured to implement distributed tiled caching. The graphics subsystem includes one or more world-space pipelines, one or more screen-space pipelines, one or more tiling units, and a crossbar unit. Each world-space pipeline is implemented in a different processing entity and is coupled to the crossbar unit. Each screen-space pipeline is implemented in a different processing entity and is coupled to a different tiling unit. Further, each tiling unit is configured to receive primitives from the crossbar unit, generate cache tile batches based on those primitives, and transmit the cache tile batches to the screen-space pipelines.

One advantage of the disclosed approaches is that primitives are processed in application-programming-interface order in a highly parallel tiling architecture. Another advantage is that primitives are processed in cache tile order, which reduces memory bandwidth consumption and improves cache memory utilization.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
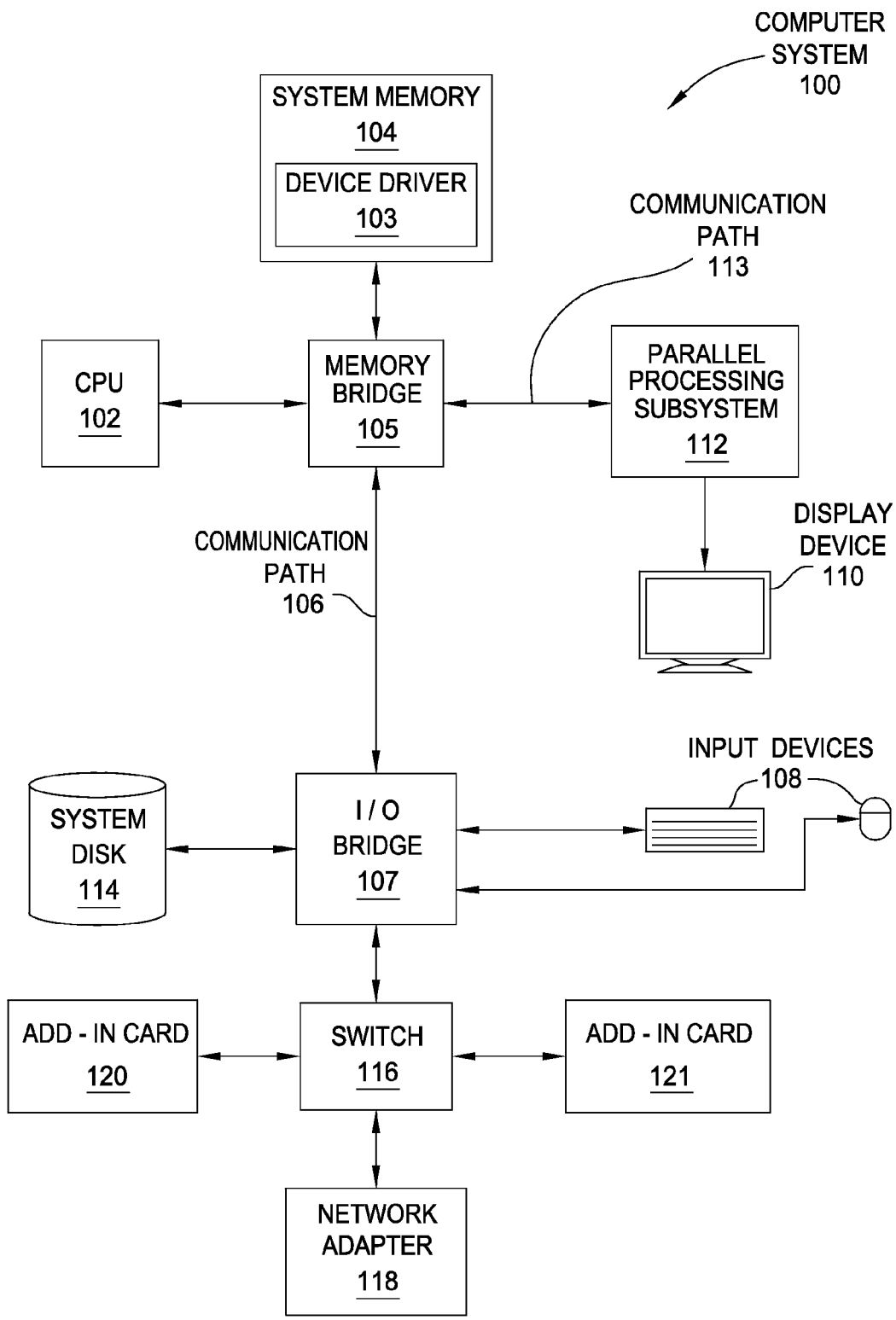
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
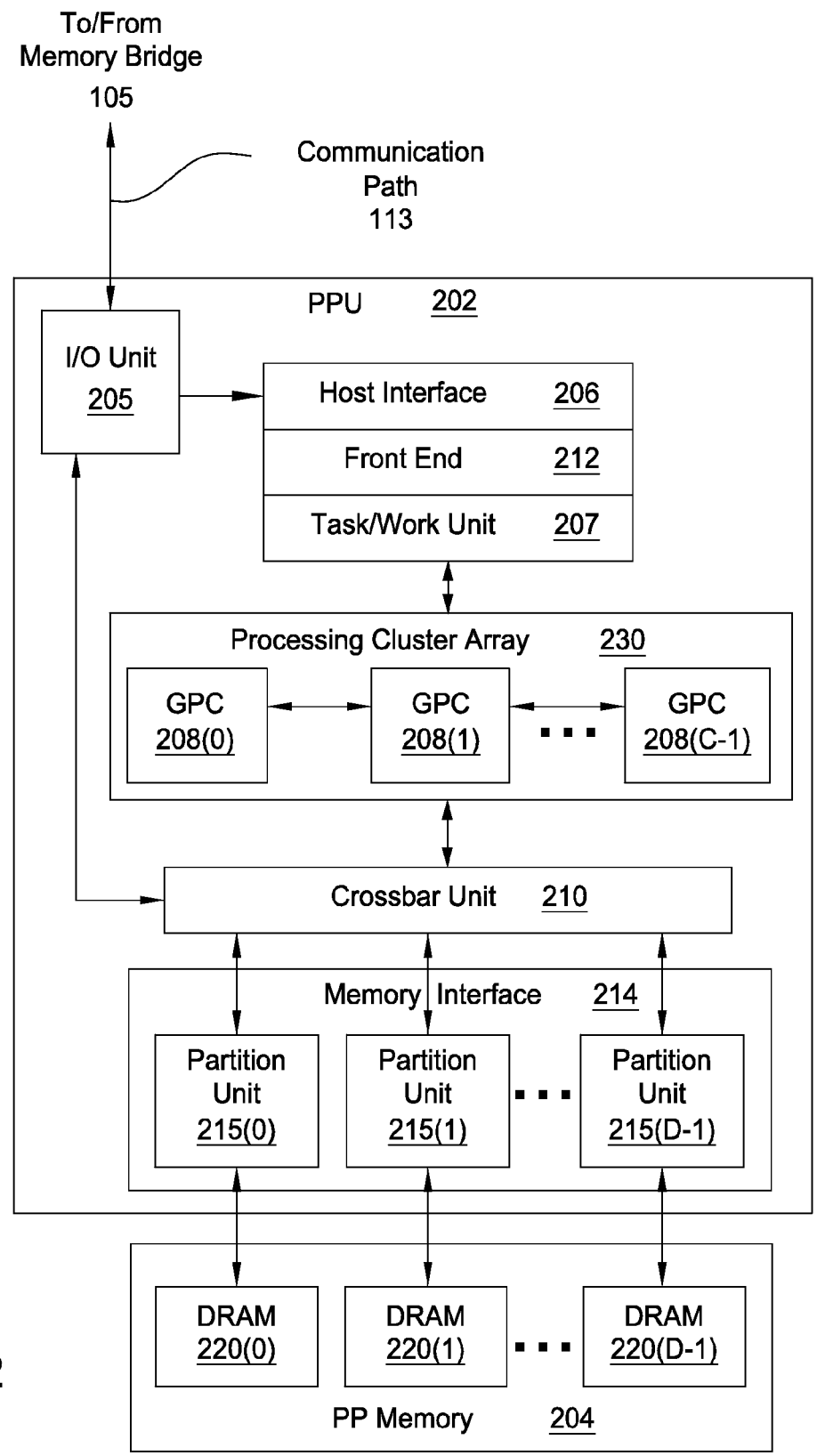
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D 1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
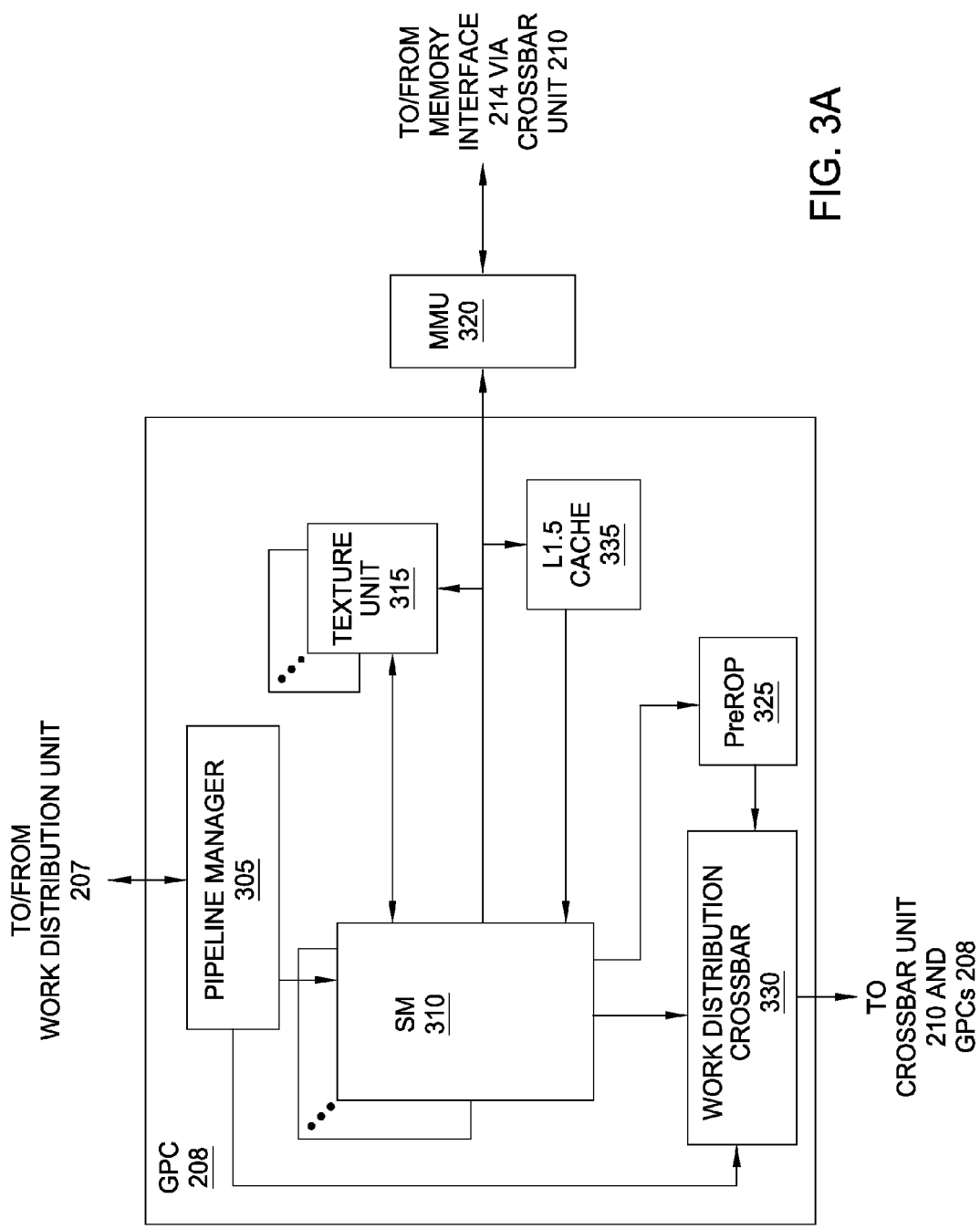
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
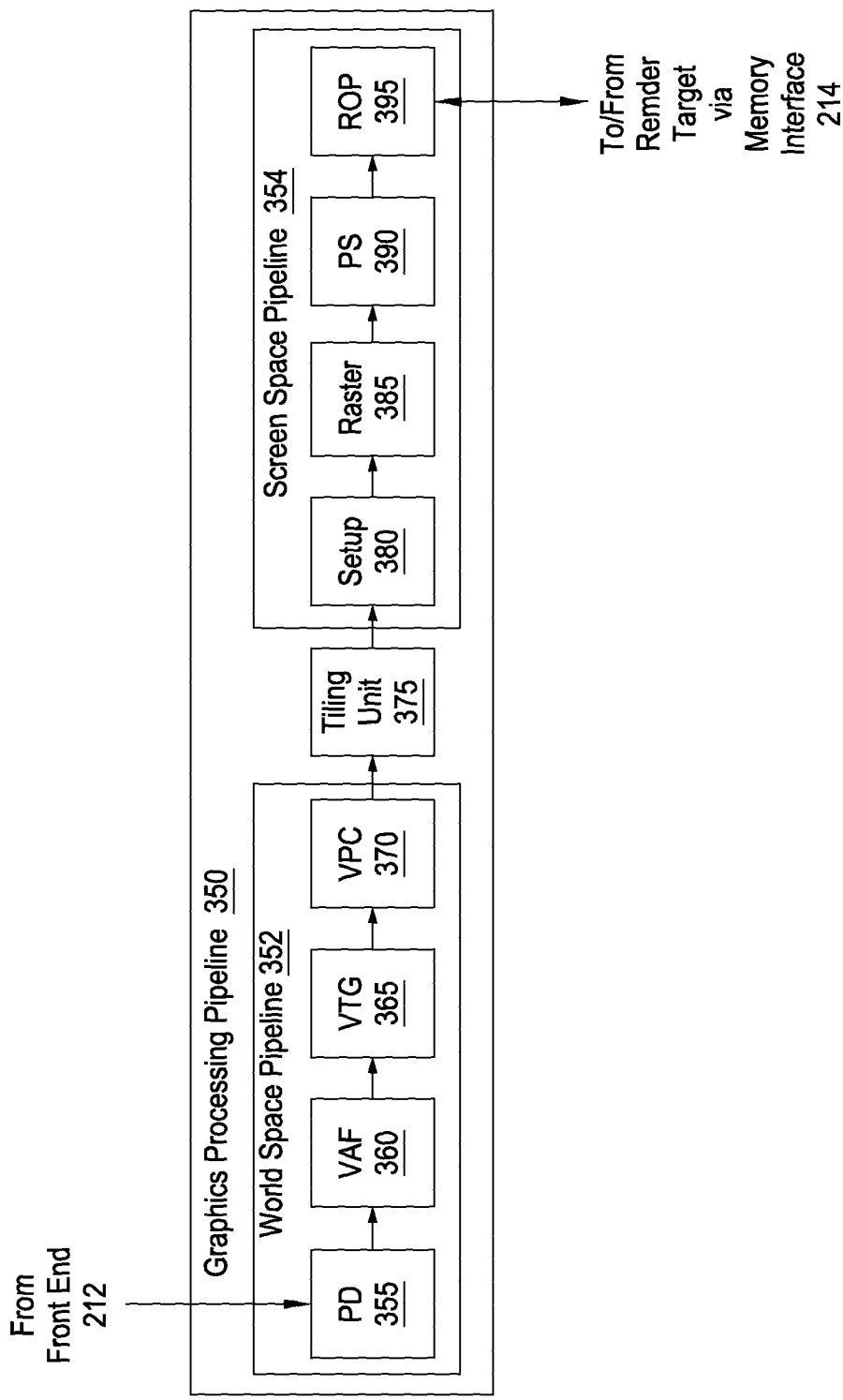
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
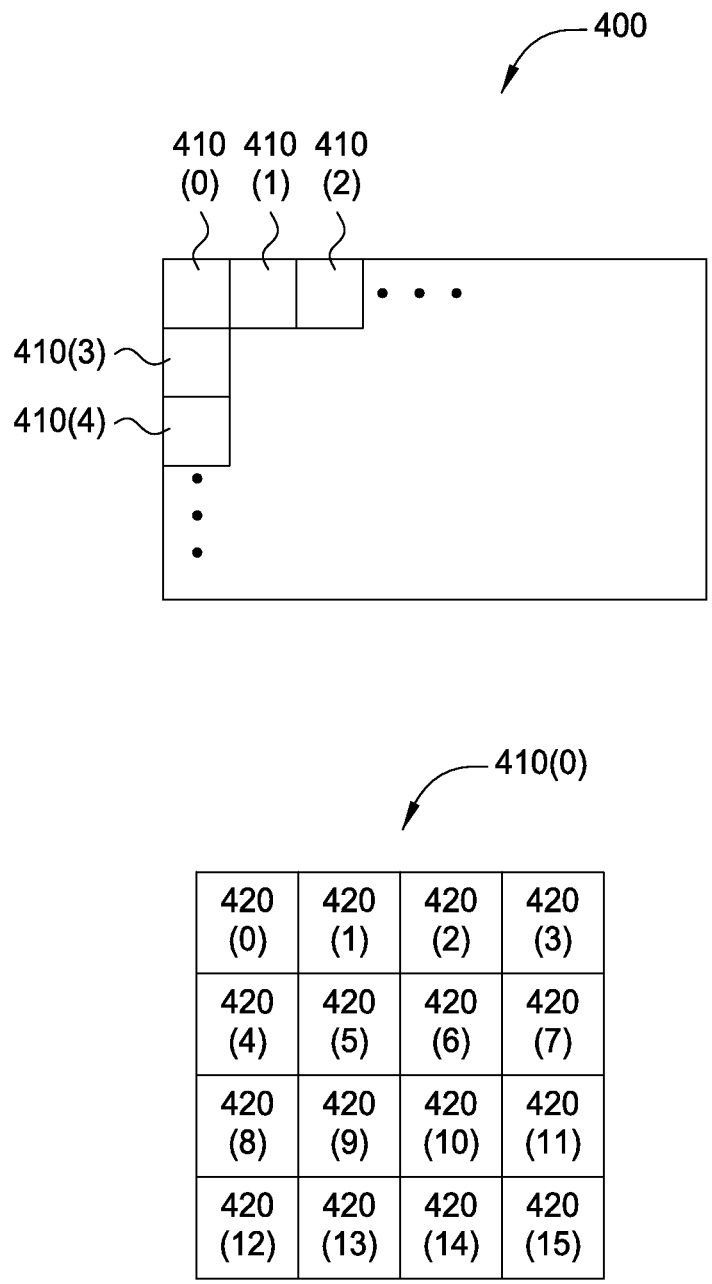
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Distributed Tiled Caching

Figure 5:
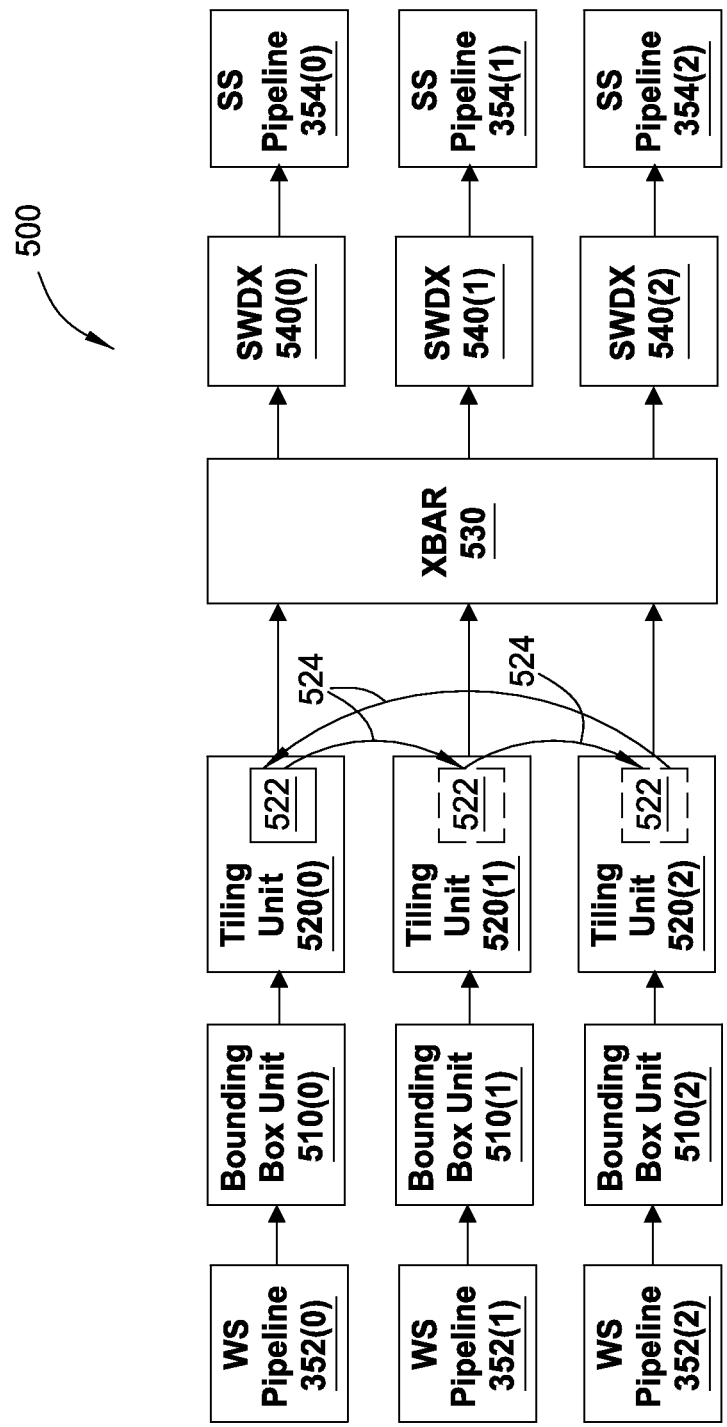
FIG. 5 illustrates a graphics subsystem configured to implement distributed tiled caching, according to one embodiment of the present invention.
Figure 6:
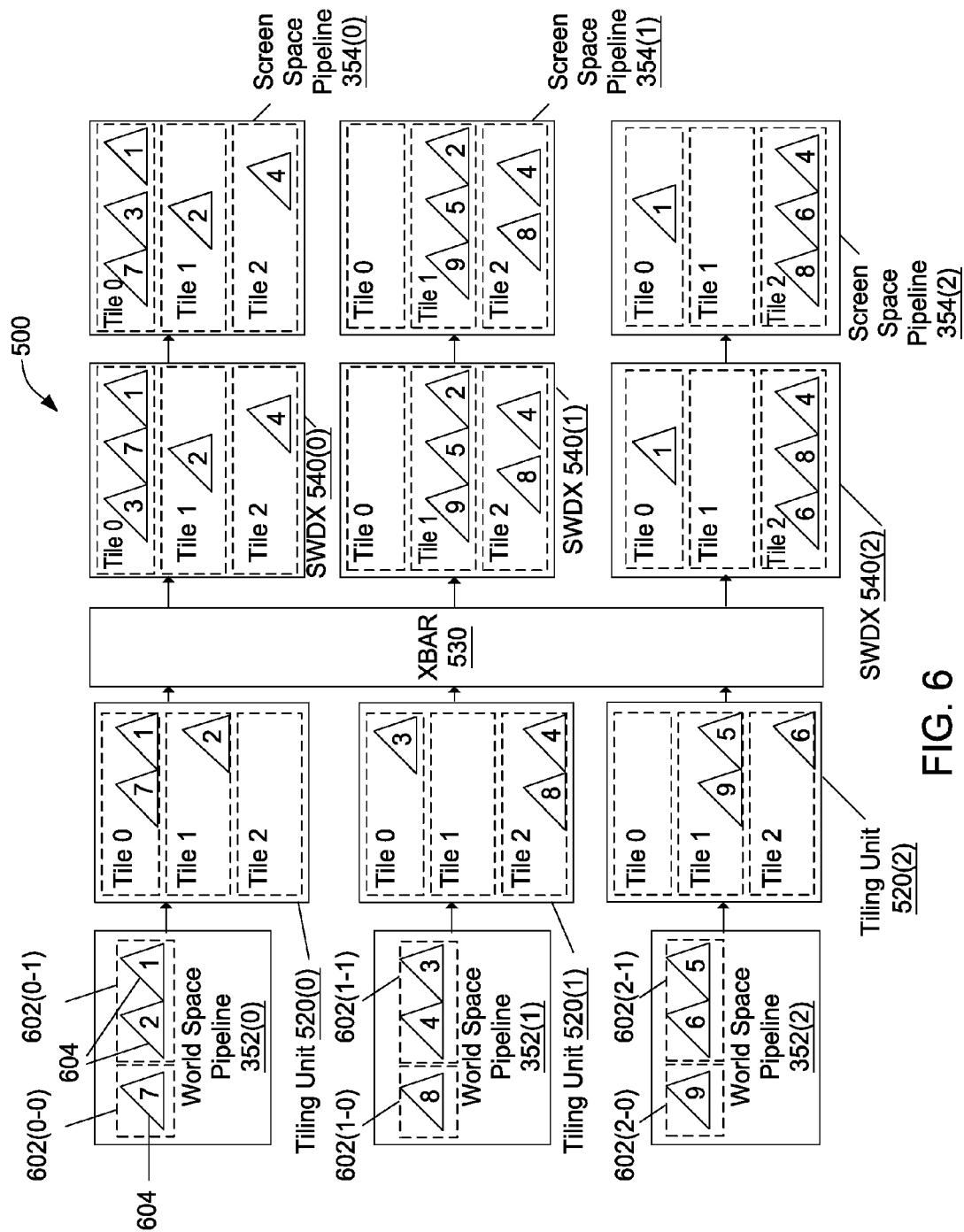
FIG. 6 is an illustration of primitives flowing through a graphics subsystem while the graphics subsystem is in operation.
Figure 7:
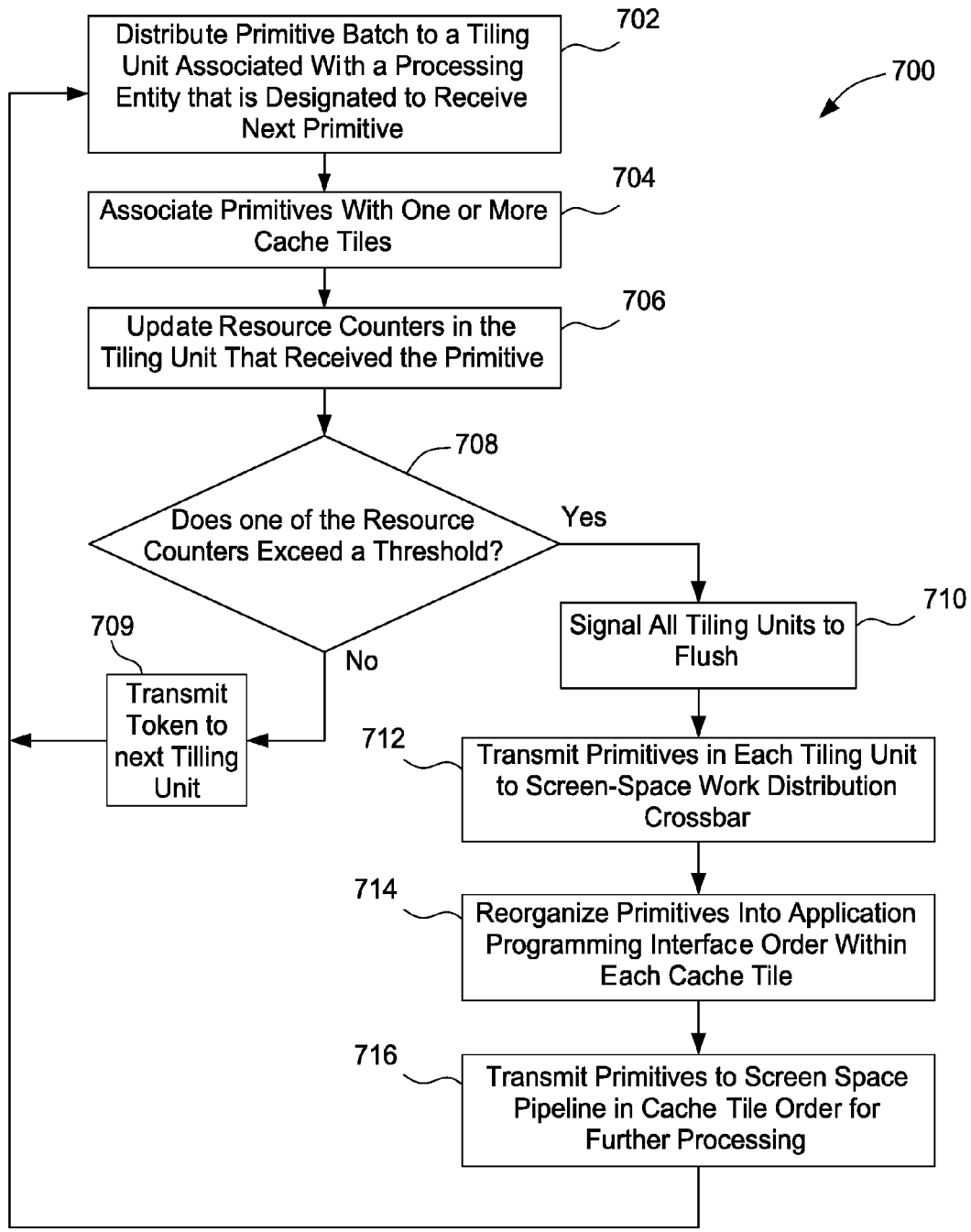
FIG. 7 is a flow diagram of method steps for distributed tiled caching, according to one embodiment of the present invention.
Figure 8:
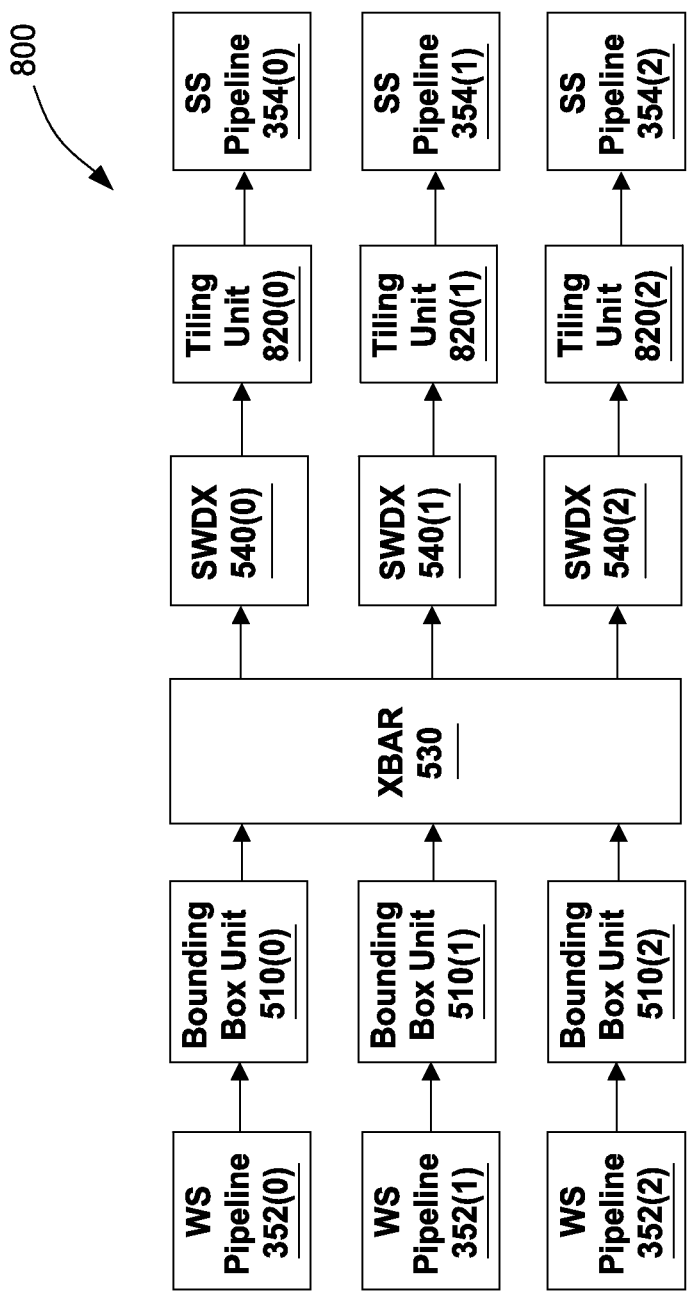
FIG. 8 illustrates a graphics subsystem configured to implement distributed tiled caching, according to another embodiment of the present invention.
Figure 9:
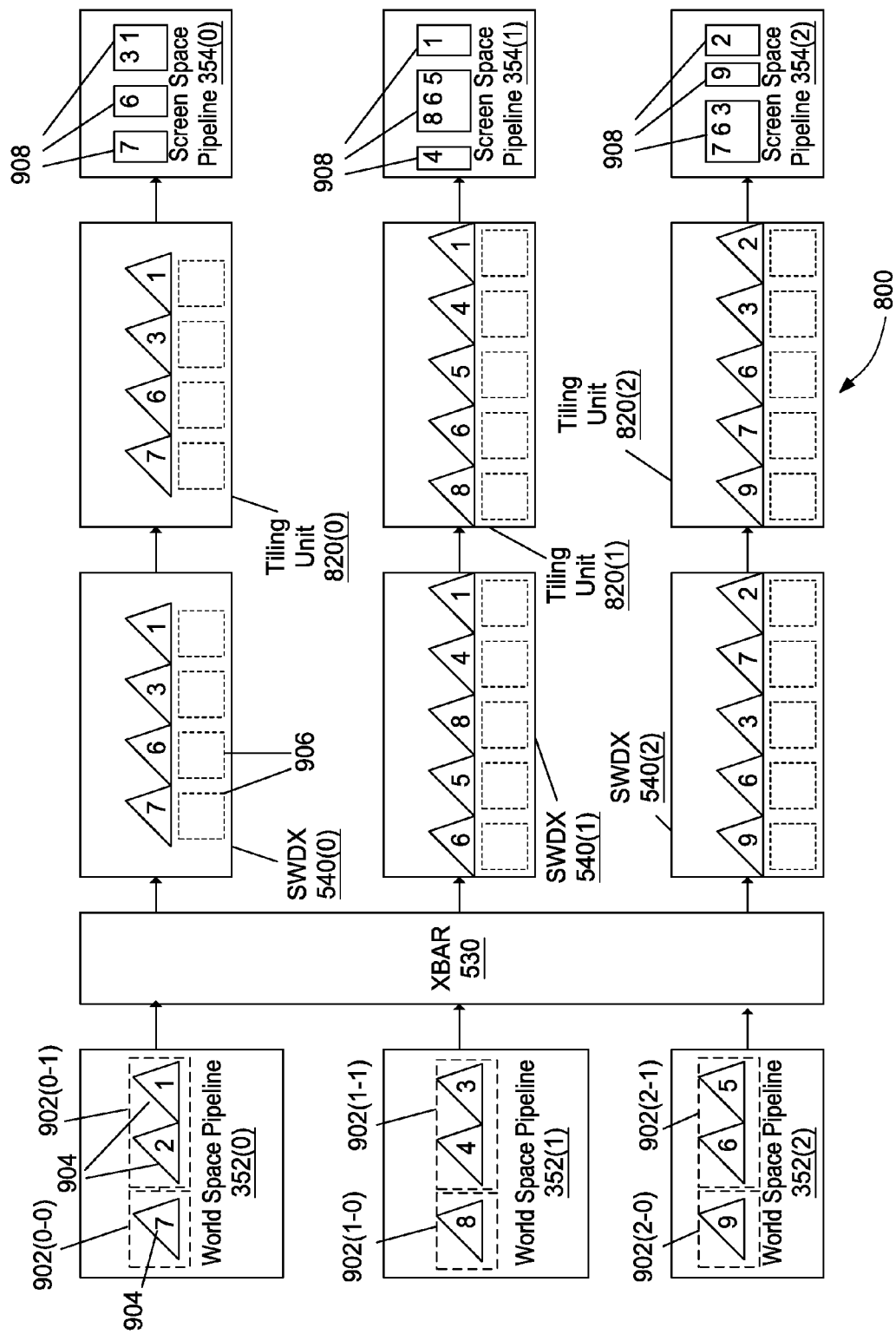
FIG. 9 is an illustration of primitives flowing through a graphics subsystem while the graphics subsystem is in operation.
Figure 10:
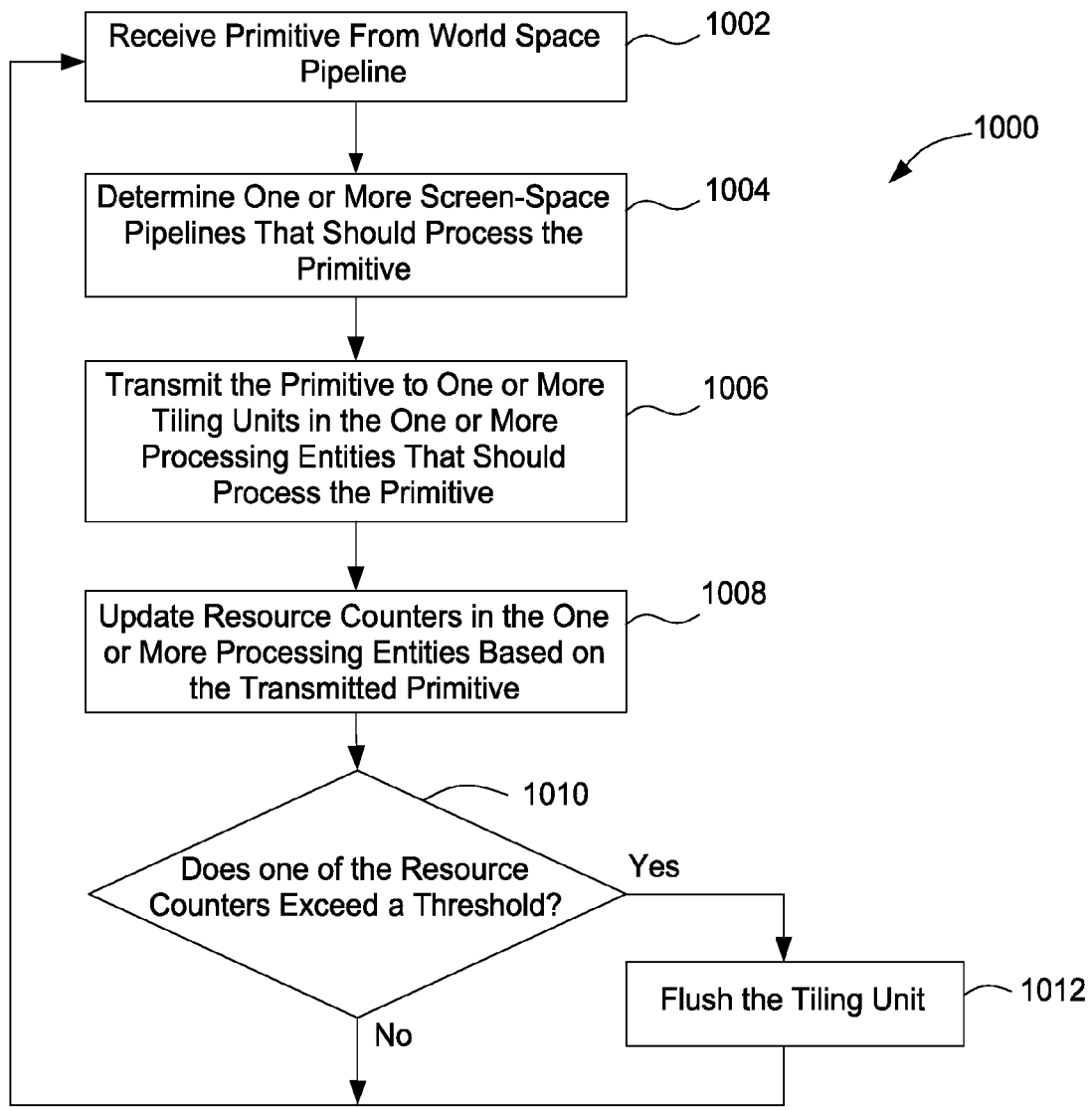
FIG. 10 is a flow diagram of method steps for distributed tiled caching, according to one embodiment of the present invention.

FIGS. 5-10 depict two embodiments of graphics subsystem architectures that implement distributed tiled caching. Distributed tiled caching is a technique in which multiple GPCs 208 are provided for increased processing performance. The multiple GPCs 208 implement multiple world-space pipelines 352 and multiple screen-space pipelines 354 for highly parallel graphics processing. FIGS. 5-7 describe an approach to distributed tiled caching in which tiling units 520 are located on a world-space side of a crossbar unit 530. FIGS. 8-10 describe an approach to distributed tiled caching in which tiling units 820 are located on a screen-space side of a crossbar unit 530.

The additional complexity that results from the presence of multiple GPCs 208 means that certain aspects of various units in the graphics subsystems described in conjunction with FIGS. 5-10 are modified with respect to corresponding units described with respect to FIG. 3B. These modifications allow the graphics subsystem to process primitives in API order, to account for certain data dependencies, and to account for other complexities related to the introduction of multiple GPCs 208. A detailed description of these two embodiments is now provided.

FIG. 5 illustrates a graphics subsystem 500 configured to implement distributed tiled caching, according to one embodiment of the present invention. As shown, the graphics subsystem 500 includes a first world-space pipeline 352(0), a second world-space pipeline 352(1), a third world-space pipeline 352(2), a first bounding box unit 510(0), a second bounding box unit 510(1), a third bounding box unit 510(2), a first tiling unit 520(0), a second tiling unit 520(1), a third tiling unit 520(2), a crossbar unit 530 ("XBAR"), a first screen-space work distribution crossbar 540(0), a second screen-space work distribution crossbar 540(1), a third screen-space work distribution crossbar 540(2), a first screen-space pipeline 354(0), a second screen-space pipeline 354(1), and third screen-space pipeline 354(2). Although the graphics subsystem 500 is shown as including three instances of the screen-space pipeline 354 and the world-space pipeline 352, the teachings provided herein apply to graphics pipelines having any number of world-space pipelines 352 and screen-space pipelines 354.

A front end unit (not shown) receives commands from a device driver (not shown) and schedules tasks for processing by each world-space pipeline 352. In one embodiment, the front end unit distributes tasks to the first world-space pipeline 352(0), the second world-space pipeline 352(1), and the third world-space pipeline 352(2) in round-robin order.

The first world-space pipeline 352(0), the second world-space pipeline 352(1), and the third world-space pipeline 352(2) function in a similar manner as described above with respect to FIGS. 1-4. In other words, the first world-space pipeline 352(0), the second world-space pipeline 352(1), and the third world-space pipeline 352(2) generate primitives in response to the work received from the front end unit. The world-space pipelines 352 transmit primitives to associated bounding box units 510.

A bounding box unit 510 is associated with each world-space pipeline 352. For each primitive transmitted to a bounding box unit 510, the bounding box unit 510 calculates a bounding box that determines which raster tiles 420 the primitives overlap, and therefore, to which screen space pipeline 354 the primitive should be transmitted. The bounding box units 510 also transmit bounding boxes to the tiling units 520. Each of the first world-space pipeline 352(0), the second world-space pipeline 352(1), and the third world-space pipeline 352(2) may transmit primitives to any or all of the first screen-space pipeline 354(0), the second screen-space pipeline 354(1), or the third screen-space pipeline 354(2).

Each tiling unit 520 is associated with and receives primitives from a corresponding world-space pipeline 352. Each tiling unit 520 receives primitives until the tiling unit decides to perform a flush operation. Each tiling unit 520 decides to perform a flush operation when a trigger condition occurs. One such trigger condition is that a resource counter maintained by the tiling unit 520 indicates that a particular resource exceeds a pre-set threshold. When any tiling unit 520 decides to perform a flush operation, that tiling unit 520 transmits a flush signal to all other tiling units 520, which causes those other tiling units 520 to also perform a flush operation. When a tiling unit 520 decides to perform a flush operation, the tiling unit 520 generates cache tile batches based on the primitives the tiling unit 520 has received and transmits the cache tile batches to the crossbar unit 530. Further, when a tiling unit 520 decides to perform a flush operation, the tiling unit 520 resets all resource counters associated with the tiling unit 520.

The crossbar unit 530 receives the primitives and transmits each primitive to one or more screen-space work distribution crossbar units 540 (SWDX). When a screen-space work distribution crossbar unit 540 receives primitives, the screen-space work distribution crossbar unit 540 reorders the primitives into application-programming-interface order (API order) for processing by the corresponding screen-space pipeline 354.

The screen-space pipelines 354 receive primitives and process the primitives as described above with respect to FIGS. 1-4. Each screen-space pipeline 354 is associated with a different, mutually exclusive, set of raster tiles 420. Thus, each screen-space pipeline 354 processes primitives that overlap a set of raster tiles associated with that screen-space pipeline 354.

The functionality of the world-space pipelines 352 and the screen-space pipelines 354 are implemented by processing entities such as general processing clusters (GPC) 208, described above. In one embodiment, the first world-space pipeline 352(0) may be implemented in a first GPC 208(0), the second world-space pipeline 352(1) may be implemented in a second GPC 208(1), and the third world-space pipeline 352(2) may be implemented in a third GPC 208(2). A GPC 208 that implements a world space pipeline 352 may also implement a screen-space pipeline 354. For example, the first GPC 208(0) may implement both the first world-space pipeline 352(0) and the first screen-space pipeline 354(0). However, each screen-space pipeline 354 is implemented by a different GPC 208 and each world-space pipeline 352 is implemented by a different GPC 208.

A detailed discussion of the operation of the tiling units 520 and the screen-space work distribution crossbar units 540 is now provided. The tiling unit 520 receives primitives from a corresponding world-space pipeline 352. The primitives are received in batches. Batches are transmitted to each world-space pipeline 352 in application-programming-interface (API) order, and in round robin fashion. For example, a first batch of primitives is transmitted to a first world-space pipeline 352(0), then a second batch of primitives is transmitted to a second world-space pipeline 352(1), then a third batch of primitives is transmitted to a third world-space pipeline 352(2), and so on. Thus, API order of batches of primitives is maintained by cycling through the world-space pipelines 352 in API order.

Additionally, the tiling units 520 receive the batches in API order by implementing a token mechanism. At any point in time during operation, one of the tiling units 520 possesses a token 522. The tiling unit 520 that possesses the token 522 is able to receive primitives from the corresponding world-space pipeline 352, while tiling units 520 that do not possess the token 522 are not able to receive primitives. The tiling unit 520 that possesses the token 522 is also able to perform a flush operation, if the tiling unit 520 determines that the tiling unit 520 is unable to accept the batch of primitives, due to the batch of primitives causing the tiling unit 520 to exceed certain local or global resources as described below. When a tiling unit 520 receives a batch of primitives, that tiling unit 520 is considered to have the most current batch of primitives, in API order. After receiving the batch of primitives, that tiling unit 520 then passes the token 522 to the next tiling unit 520, causing that next tiling unit 520 to be able to receive primitives. When the next tiling unit 520 receives the next batch of primitives in API order, that tiling unit 520 passes the token 522 to the next tiling unit, and so on. The token 522 is passed in a cyclical order, as indicated by token passing arrows 524, which allows each tiling unit 520 to have a turn accepting primitives.

In addition to being able to accept primitives, the token 522 also allows the tiling unit 520 to perform a flush operation. When a tiling unit 520 decides to perform a flush operation, the tiling unit 520 has one or more batches of primitives. Because the batches of primitives are passed to the tiling units 520 in rotating API order, the batches of primitives that each tiling unit 520 includes may have "gaps." For example, the first tiling unit 520(0) may receive a first batch of primitives and a fourth batch of primitives, but not second or third batches of primitives in API order, which are transmitted to the second tiling unit 520(1) and the third tiling unit 520(2), respectively.

Because the primitives transmitted from each tiling unit 520 may include gaps in API order, when one tiling unit 520 performs a flush operation, all other tiling units 520 also perform a flush operation. Causing all tiling units 520 to perform a flush operation at the same time allows the screen-space work distribution crossbars 540 to receive primitives from all batches in API order, without gaps, because each tiling unit 520 "covers" the gaps of the other tiling units. In other words, even though individual tiling units 520 may have gaps in API order, when the tiling units 520 perform a flush operation together, the primitives that are transmitted by the tiling units 520 include all primitives, without gaps.

When a tiling unit 520 decides to perform a flush operation, the tiling unit 520 generates cache tile batches, and transmits the cache tile batches downstream to the crossbar 530, for distribution to the screen-space pipelines 354. For each screen-space pipeline 354, a screen-space work distribution crossbar 540 receives the cache tile batches including primitives and reorganizes the primitives into API order for each cache tile.

To generate the cache tile batches, each tiling unit 520 accepts and stores primitives until the tiling unit 520 decides to perform a flush operation. Each cache tile batch is associated with a different cache tile and includes primitives that overlap that cache tile. In one embodiment, the tiling unit 520 determines which cache tile the primitives overlap by comparing a border of the cache tile with bounding boxes received from a bounding box unit 510. Upon receiving a batch of primitives, a tiling unit 520 updates several resource counters associated with the batch of primitives. If any of the resource counters indicates that a resource has exceeded a threshold, then the tiling unit 520 performs a flush operation.

The resource counters are configured to track the degree of utilization of various resources associated with the primitives received by the tiling units 520. Resources are either global resources or local resources. Global resources are pools of resources that are shared by all tiling units 520. Local resources are independently maintained by each tiling unit 520 and are not shared. Several examples of such resources are now provided.

One type of local resource is a primitive storage space for storing primitives. Each tiling unit 520 includes a primitive storage space that is maintained independently of primitive storage space for other tiling units 520. When a tiling unit 520 receives a primitive, some of the primitive storage space is occupied by the primitive.

One type of global resource is a vertex attribute circular buffer. The vertex attribute circular buffer includes circular buffer entries that include vertex attributes. The vertex attribute circular buffer is available to units in the graphics subsystem 500 for reading vertex attributes associated with primitives. Each circular buffer entry in the vertex attribute circular buffer occupies a variable amount of storage space. Each tiling unit 520 maintains a count of the amount of space occupied by circular buffer entries associated with primitives in the tiling unit 520.

In one embodiment, the vertex attribute circular buffer may be structured as a collection of smaller per-world-space-pipeline circular buffers. Each per-world-space pipeline circular buffer is associated with a different world-space pipeline 352. If memory space associated with any of the per-world-space-pipeline circular buffers exceed a threshold value, then the associated tiling unit performs a flush operation.

Another type of global resource is a pool of constant buffer table indices. At the application-programming-interface level, an application programmer is permitted to associate constants with shader programs. Different shader programs may be associated with different constants. Each constant is a value that may be accessed while performing computations associated with the shader programs. The pool of constant buffer table indices is a global resource by which constants are associated with shader programs.

When the tiling units 520 perform a flush operation, the cache tile batches that include primitives arrive at the crossbar unit 530, which transmits the primitives in the cache tile batches to the screen-space work distribution crossbar units 540. The screen-space work distribution crossbars 540 reorganize primitives within each cache tile into API order. The screen-space work distribution crossbars 540 output cache tile batches that include primitives arranged in API order to the screen-space pipelines 354 for processing by the screen-space pipelines 354.

Now that the basic architecture of the graphics subsystem 500 has been described, an example of the operation of the graphics subsystem 500 is provided. The example depicts primitives flowing through the graphics subsystem 500 described in FIG. 5.

FIG. 6 is an illustration of primitives flowing through a graphics subsystem 500 while the graphics subsystem 500 is in operation. As shown, the graphics subsystem 600 includes a first world-space pipeline 352(0), a second world-space pipeline 352(1), a third world-space pipeline 352(2), a first tiling unit 520(0), a second tiling unit 520(1), a third tiling unit 520(2), a crossbar unit 530 ("XBAR"), a first screen-space work distribution crossbar 540(0), a second screen-space work distribution crossbar 540(1), a third screen-space work distribution crossbar 540(2), a first screen-space pipeline 354(0), a second screen-space pipeline 354(1), and third screen-space pipeline 354(2).

In operation, a first batch of primitives 602(0-1) is transmitted to and processed by first world-space pipeline 352(0). Then, a second batch of primitives 602(1-1) is transmitted to and processed by second world-space pipeline 352(1), and a third batch of primitives 602(2-1) is transmitted to and processed by third world-space pipeline 352(2). Similarly, fourth batch of primitives 602(0-0), fifth batch of primitives 602(1-0), and sixth batch of primitives 602(2-0) are transmitted to first world-space pipeline 352(0), second world-space pipeline 352(1), and third world-space pipeline 352(2), respectively. Each of the primitives in the batches of primitives 602 is designated by a number from "1" to "9" that indicates API order of the primitives, where "1" indicates the earliest primitive in API order and "9" indicates the latest primitive in API order.

The first world-space pipeline 352(0) processes two batches: first batch 602(0-1), and second batch 602(0-0). First batch 602(0-1) includes primitives 1 and 2, and second batch 602(0-0) includes primitive 7. When the first world-space pipeline 352(0) has completed processing the first batch 602(0-1), the first world-space pipeline 352(0) requests that the first tiling unit 520(0) accepts the first batch 602(0-1). The first tiling unit 520(0) determines that no resource count would be above a threshold value if the first tiling unit 520(0) were to accept the first batch 602(0-1), and therefore accepts the first batch 602(0-1).

The next batch of primitives in API order is second batch 602(1-1), in second world-space pipeline 352(1). The second world-space pipeline 352(1) processes primitive 3 and primitive 4 and requests that the second tiling unit 520(1) accept primitive 3 and primitive 4. The second tiling unit 520(1) determines that no resource count would be above a threshold value if the second tiling unit 520(1) were to accept the second batch 602(1-1), and therefore accepts the second batch 602(1-1). After accepting the second batch 602(1-1), the next batch of primitives in API order is processed.

The next batch of primitives is third batch 602(2-1), in third world-space pipeline 352(2). The third world-space pipeline 352(2) processes primitive 5 and primitive 6 and requests that the third tiling unit 520(2) processes primitive 5 and primitive 6. The third tiling unit 520(2) determines that no resource count would be above a threshold value if the third tiling unit 520(2) were to accept the third batch 602(2-1), and therefore accepts the third batch 602(2-1).

After accepting the third batch 602(2-1), the next batch of primitives in API order is processed.

Because the order of processing the primitives 604 is round robin, the next batch to be processed is fourth batch 602(0-0) in first world-space pipeline 352(0), which includes primitive 7. The first world-space pipeline 352(0) processes the fourth batch 602(0-0) and requests that the first tiling unit 520(0) accept the fourth batch 602(0-0). The first tiling unit 520(0) determines that no resource count would be above a threshold value if the first tiling unit 520(0) were to accept the fourth batch 602(0-0), and therefore accepts the fourth batch 602(0-0). After accepting the fourth batch 602(0-0), the next batch of primitives in API order is processed.

The next batch of primitives is fifth batch 602(1-0), in second world-space pipeline 352(1), which includes primitive 8. The second world-space pipeline 352(1) processes the fifth batch 602(1-0). The second tiling unit 520(1) determines that no resource count would be above a threshold value if the second tiling unit 520(1) were to accept the fifth batch 602(1-0), and therefore accepts the fifth batch 602(1-0). After accepting the fifth batch 602(1-0), the next batch of primitives in API order is processed.

The next batch of primitives is the sixth batch 602(2-0), in third world-space pipeline 352(2), which includes primitive 9. The third world-space pipeline 352(2) processes the sixth batch 602(2-0). The third tiling unit 520(2) determines that no resource count would be above a threshold value if the third tiling unit 520(2) were to accept the sixth batch 602(2-0), and therefore accepts the sixth batch 602(2-0). After accepting the sixth batch 602(2-0), the next batch of primitives in API order is processed.

The next batch of primitives in API order is not shown in FIG. 6. However, when the first world-space pipeline 352(0) requests that the first tiling unit 520(0) accept the next batch of primitives, the first tiling unit 520(0) determines that a resource count would exceed a threshold value and therefore the first tiling unit 520(0) decides to perform a flush operation. When the first tiling unit 520(0) decides to perform a flush operation, the first tiling unit 520(0) transmits a command to the second tiling unit 520(1) and the third tiling unit 520(2) to also perform a flush operation. Thus, all of the first tiling unit 520(0), the second tiling unit 520(1), and the third tiling unit 520(2) perform a flush operation.

When a tiling unit 520 performs a flush operation, the tiling unit 520 determines which cache tile 410 the primitives 604 in the tiling unit 520 overlap. The tiling unit 520 then generates cache tile batches, where each cache tile batch includes primitives associated with a particular cache tile.

The first tiling unit 520(0) determines that primitive 1 and primitive 7 overlap cache tile 0, and generates a cache tile batch associated with cache tile 0 that includes primitive 1 and primitive 7. The first tiling unit 520(0) also determines that primitive 2 overlaps cache tile 1, and generates a cache tile batch associated with cache tile 1 that includes primitive 2. Finally, the first tiling unit 520(0) determines that none of the primitives in the first tiling unit 520(0) overlap cache tile 2.

The second tiling unit 520(1) determines that primitive 3 overlaps cache tile 0 and generates a cache tile batch associated with cache tile 0 that includes primitive 3. The second tiling unit 520(1) also determines that primitive 4 and primitive 8 overlap cache tile 2, and that no primitives in the second tiling unit 520(1) overlap cache tile 1. The second tiling unit 520(1) generates cache tile batches and transmits the cache tile batches to the crossbar unit 530 accordingly.

Finally, the third tiling unit 520(2) determines that primitive 5 and primitive 9 overlap cache tile 1, that primitive 6 overlaps cache tile 2, and that no primitives overlap cache tile 0. The third tiling unit 520(2) generates the appropriate cache tile batches and transmits the cache tile batches to the crossbar unit 530 accordingly.

The crossbar unit 530 transmits primitives to the appropriate screen-space work distribution crossbars 540, based on which raster tiles the primitives overlap. For example, the crossbar unit 530 transmits primitive 1 to a first screen-space work distribution crossbar 540(0), and a third screen-space work distribution crossbar 540(2), because primitive 1 overlaps raster tiles 420 associated with the first screen-space pipeline. The other primitives 604 depicted in the screen-space work distribution crossbars 540 are distributed as shown in FIG. 6.

As shown, some of the primitives in the first screen-space work distribution crossbar 540(0) and the third screen-space work distribution crossbar 540(2) are not in API order. For example, in cache tile 0 in the first screen-space work distribution crossbar 540(0), the primitives are ordered as follows: primitive 1, then primitive 7, then primitive 3. Additionally, in cache tile 2, in the third screen-space work distribution crossbar 540(2), the primitives are ordered as follows: primitive 4, then primitive 8, then primitive 6. The screen-space work distribution crossbars 540 reorder the primitives into API order in each cache tile. After the screen-space work distribution crossbars 540 reorder these primitives, the screen-space work distribution crossbars 540 transmit the primitives to the corresponding screen-space pipeline 354. As shown, the first cache tile in the first screen-space pipeline 354(0) includes primitives in the order of primitive 1, then primitive 3, then primitive 7. Similarly, in the third cache tile in the third screen-space pipeline 354(2), the primitives are ordered primitive 4, then primitive 6, and then primitive 8. Thus, all primitives in each cache tile are in API order. The screen-space pipelines 354 process the primitives in this order.

FIG. 7 is a flow diagram of method steps for performing distributed tiled caching, according to one embodiment of the present invention. Although the method steps are described in conjunction with FIGS. 1-6, persons skilled in the art will understand that any system configured to perform the method steps, in any order, falls within the scope of the present invention.

As shown, a method 700 begins in step 702, where a world-space pipeline 352 distributes a batch of primitives to a tiling unit 520 associated with a processing entity that is designated to receive a next batch of primitives in API order. In step 704, the tiling unit 520 that receives the batch of primitives associates each primitive in the batch of primitives with one or more cache tiles. In step 706, the tiling unit 520 updates one or more resource counters based on the received primitives. In step 708, the tiling unit determines whether one of the resource counters exceeds a threshold. If a resource counter does not exceed a threshold, then in step 709, the tiling unit 520 transmits the token 522 to the next tiling unit 520. Subsequently, the method 700 returns to step 708. If a resource counter does exceed a threshold, then the method proceeds to step 710.

In step 710, the tiling unit 520 that determines that a resource count exceeds a threshold signals all other tiling units 520 to flush. In step 712, each tiling unit 520 transmits each primitive to one or more screen-space work distribution crossbars 540 associated with raster tiles 420 that the primitives overlap. In step 714, each screen-space work distribution crossbar 540 reorganizes the primitives into API order for each cache tile. Primitives received from any particular tiling unit 520 are already in API order. However, primitives received from different tiling units 520 may not be in API order and would therefore be rearranged into API order. In step 716, the screen-space work distribution crossbars 540 transmit the primitives to screen-space pipelines 354 for processing.

FIGS. 8-10 illustrate a configuration of a graphics subsystem 800 in which tiling units 820 are located on the screen-space side of a crossbar unit 530. The architecture and operation of graphics subsystem 800 is now described in detail.

FIG. 8 illustrates a graphics subsystem 800 configured to implement distributed tiled caching, according to another embodiment of the present invention. As shown, the graphics subsystem 800 includes a first world-space pipeline 352(0), a second world-space pipeline 352(1), a third world-space pipeline 352(2), a first bounding box unit 510(0), a second bounding box unit 510(1), a third bounding box unit 510(2), a crossbar unit 530 ("XBAR"), a first screen-space work distribution crossbar 540(0), a second screen-space work distribution crossbar 540(1), a third screen-space work distribution crossbar 540(2), a first tiling unit 820(0), a second tiling unit 820(1), a third tiling unit 820(2), a first screen-space pipeline 354(0), a second screen-space pipeline 354(1), and third screen-space pipeline 354(2).

In a similar manner as with the graphics subsystem 500 depicted in FIG. 5, the graphics subsystem 800 includes at least three instances of the screen-space pipeline 354 and the world-space pipeline 352, for increased performance. The functionality of the world-space pipelines 352 and the screen-space pipelines 354 is similar to the functionality of the corresponding units disclosed in FIGS. 1-5. However, the tiling units 820 are located on the screen-space side of the crossbar unit 530, instead of being located on the world-space section of the crossbar unit 530. Thus, tiling operations (i.e., associating primitives with cache tiles and generating cache tile batches) do not occur until after primitives have been transmitted to the screen-space side of the cross-bar unit 530 and after the primitives from the world-space pipelines 352 have been arranged into API order by the screen-space work distribution crossbars 540.

The first world-space pipeline 352(0), the second world-space pipeline 352(1), and the third world-space pipeline 352(2) function in a similar manner as described above with respect to FIGS. 1-4. In other words, the first world-space pipeline 352(0), the second world-space pipeline 352(1), and the third world-space pipeline 352(2) generate primitives in response to the work received from the front end unit.

The world-space pipelines 352 transmit these primitives through the crossbar unit 530 to one or more screen-space pipelines 354 associated with raster tiles that the primitives overlap. Screen-space work-distribution crossbars 540 associated with the screen-space pipelines 354 receive the primitives, reorder the primitives into API order, and provide the primitives to the tiling units 820.

Each tiling unit 820 receives primitives from the screen-space work distribution crossbar 540 and generates cache tile batches based on the primitives. The tiling units 820 generate a cache tile batch by aggregating primitives that overlap the cache tile associated with the cache tile batch. The tiling units 820 may determine which primitives overlap a particular cache tile by comparing bounding boxes received from bounding box units 510 with a border of the cache tile. Just as with the tiling units 520 depicted in FIG. 5, the tiling units 820 depicted in FIG. 8 maintain resource counts for both local and global resource types. Each tiling unit 820 maintains resource counts for local resources independently of each other tiling units 820. When one tiling unit 820 determines that a resource count is exceeded, the tiling unit 820 performs a flush operation. Unlike with the tiling units 520 depicted in FIG. 5, the tiling units 820 depicted in FIG. 8 do not transmit a signal to other tiling units 820 that causes those tiling units to perform a flush operation when the original tiling unit 820 performs a flush operation. Each tiling unit 820 is able to perform a flush operation independently because unlike with the tiling units 520 depicted in FIG. 5, there is no possibility for gaps to form. In other words, the world-space pipelines 352 simply transmit the primitives to the screen-space pipelines 354 to which the primitives are destined. Only primitives that are associated with a particular screen-space pipeline 354 are transmitted to any particular tiling unit 820, so that tiling unit 820 has all of the primitives that are needed in any particular sequence of primitives.

Because the tiling unit 820 is across the crossbar unit 530 from the world-space pipeline 352 and the bounding box unit 510, the crossbar unit 530 transmits bounding boxes to the tiling unit 820 in order to permit the tiling unit 820 to determine which cache tiles primitives are associated with. The crossbar unit 530 also transmits other information that is useful to the tiling unit 820. For example, the crossbar unit 530 transmits an amount of space occupied by circular buffer entries associated with primitives to the tiling unit 820 to permit the tiling unit 820 to update resource counters associated with the circular buffers. The crossbar unit 530 or another unit may also transmit additional information related to the local and global resources discussed above with respect to FIG. 5 to the tiling units 820, to permit the tiling units 820 to update associated resource counters. The tiling units 820 organize the primitives that the tiling units 820 receive into cache tile batches that each include primitives in API order.

Now that the basic architecture of the graphics subsystem 800 has been described, an example of the operation of the graphics subsystem 800 is provided. The example depicts primitives flowing through the graphics subsystem 800 described in FIG. 8.

FIG. 9 is an illustration of primitives flowing through a graphics subsystem 800 while the graphics subsystem 800 is in operation. As shown, the graphics subsystem 900 includes a first world-space pipeline 352(0), a second world-space pipeline 352(1), a third world-space pipeline 352(2), a crossbar unit 530 ("XBAR"), a first screen-space work distribution crossbar 540(0), a second screen-space work distribution crossbar 540(1), a third screen-space work distribution crossbar 540(2), a first tiling unit 820(0), a second tiling unit 820(1), a third tiling unit 820(2), a first screen-space pipeline 354(0), a second screen-space pipeline 354(1), and third screen-space pipeline 354(2).

A first batch of primitives 902(0-1) is transmitted to and processed by first world-space pipeline 352(0). A second batch of primitives 902(1-1) is transmitted to and processed by second world-space pipeline 352(1), and third batch of primitives 902(2-1) is transmitted to and processed by third world-space pipeline 352(2). Similarly, fourth batch of primitives 902(0-0), fifth batch of primitives 902(1-0), and sixth batch of primitives 902(2-0) are transmitted to first world-space pipeline 352(0), second world-space pipeline 352(1), and third world-space pipeline 352(2), respectively. Each of the primitives in the batches of primitives 902 is designated by a number from "1" to "9" that indicates API order of the primitives, where "1" indicates the earliest primitive in API order and "9" indicates the latest primitive in API order.

After the world-space pipelines 352 process the primitives and transmit the primitives to the crossbar unit 530, the screen-space work distribution crossbars 540 receive primitives destined for the screen-space pipelines 354. The screen-space work distribution crossbars 540 reorder the primitives received into API order. The first screen-space work distribution crossbar 540(0) receives primitive 1, primitive 7, primitive 3, and primitive 6, and reorders the primitives into API order. The second screen-space work distribution crossbar 540(1) receives primitive 1, primitive 4, primitive 8, primitive 5, and primitive 6, and reorders the primitives into API order. The third screen-space work distribution crossbar 540(2) receives primitive 2, primitive 7, primitive 3, primitive 6, and primitive 9, and reorders the primitives into API order. Each screen-space work distribution crossbar 540 also receives bounding boxes 906 associated with each primitive 904 and passes on the bounding boxes 906 to the corresponding tiling units 820. As shown, the primitives 904 in each of the tiling units 820 are in API order.

The tiling units 820 organize the primitives 904 into cache tile batches 908 and transmit the cache tile batches to the screen-space pipelines 354 for processing. Cache tile batches in the first screen-space pipeline 354(0) include a first cache tile batch 908 that includes primitive 1 and primitive 3, a second cache tile batch 908 that includes primitive 6, and a third cache tile batch 908 that includes primitive 7. The second screen-space pipeline 354(1) includes a first cache tile batch 908 that includes primitive 1, a second cache tile batch 908 that includes primitive 5, primitive 6, and primitive 8, and a third cache tile batch 908 that includes primitive 4. Finally, the third screen-space pipeline 354(2) includes a first cache tile batch 908 that includes primitive 2, a second cache tile batch 908 that includes primitive 9, and a third cache tile batch 908 that includes primitive 3, primitive 6, and primitive 7. All of the primitives in each of the cache tile batches 908 are in API order.

FIG. 10 is a flow diagram of method steps for distributed tiled caching, according to one embodiment of the present invention. Although the method steps are described in conjunction with FIGS. 1-4 and 8-9, persons skilled in the art will understand that any system configured to perform the method steps, in any order, falls within the scope of the present invention.

As shown, a method 1000 begins in step 1002, where a bounding box unit 510 receives a primitive from a world-space pipeline 352. In step 1004, the bounding box unit 510 determines one or more screen-space pipelines 354 that are associated with raster tiles that the primitive overlaps. In step 1006, the crossbar unit 530 transmits the primitives to one or more tiling units, through the screen-space work distribution crossbar units 540, which reorder the primitives into API order. When the tiling units 820 receive the primitives, the tiling units 820 update resource counters associated with the primitives. In step 1010, the tiling units 820 determine whether one of the resource counters indicate that a resource exceeds a threshold. If a resource exceeds a threshold, then the method proceeds to step 1012. In step 1012, a tiling unit 820 performs a flush operation, in which the tiling unit 820 transmits the primitives to the screen-space pipelines 354 and resets all resource counters for the tiling unit 820. If a resource does not exceed a threshold, then the method returns to step 1002.

In sum, a technique for processing primitives in a highly parallel graphics processing architecture that includes multiple processing entities and implements tiled caching is disclosed. Such a highly parallel architecture implements multiple instances of world-space pipelines and screen-space pipelines. A crossbar transmits primitives from the world-space pipelines to the screen-space pipelines.

In a first embodiment, tiling units exist on the world-space side of the crossbar. One tiling unit is provided for each world-space pipeline. Each tiling unit accumulates primitives received from a corresponding world-space pipeline until the tiling unit makes a determination to perform a flush operation. A particular tiling unit may decide to perform a flush operation when a resource counter indicates that a resource count associated with a particular resource exceeds a threshold. When one tiling unit performs a flush operation, that tiling unit transmits a signal to all of the other tiling units, which causes those tiling units to also perform a flush operation.

Each tiling unit performs a flush operation by transmitting primitives, in cache tile order, to the screen-space pipelines. Within each screen-space pipeline, a screen-space work distribution crossbar reorganizes the primitives into API order for subsequent processing by units in the screen space pipeline that are downstream of screen-space work distribution crossbar.

One advantage of the disclosed approach is that primitives are processed in application-programming-interface order in a highly parallel tiling architecture. Another advantage is that primitives are processed in cache tile order, which reduces memory bandwidth consumption and improves cache memory utilization. A further advantage is that multiple tiling units do not perform redundant work. In other words, because each primitive is processed by only one world-space pipeline, each primitive is only provided to a single tiling unit. Therefore, each primitive does not need to be processed by more than one tiling unit.

In a second embodiment, tiling units exist on the screen-space side of the crossbar. One tiling unit is provided for each screen-space pipeline. Additionally, screen-space work distribution crossbars are provided between the crossbar and the tiling units. One screen-space work distribution crossbar is provided for each screen-space pipeline. The crossbar unit transmits primitives to the screen-space work distribution crossbar units, which rearrange the primitives into application-programming-interface order and transmit those primitives to corresponding tiling units. Each tiling unit accumulates the primitives received from the associated screen-space work distribution crossbar unit until the tiling unit makes a determination to perform a flush operation. A tiling unit may make such a determination when a resource counter indicates that a resource count associated with a particular resource exceeds a threshold. Further, each tiling unit determines when to perform a flush operation independently of the other tiling units. That is, a decision to perform a flush operation for one tiling unit does not cause other tiling units to perform a flush operation. Each tiling unit performs a flush operation by transmitting primitives, in cache tile order, to units in a corresponding screen-space pipeline. Because the tiling units receive the primitives in application-programming-interface order, no further reordering of primitives is necessary after a tiling unit performs a flush operation.

One advantage of the disclosed approach is that primitives are processed in application-programming-interface order in a highly parallel tiling architecture. Another advantage is that because each tiling unit is associated with independent sets of raster tiles, each tiling unit may operate independently. More specifically, each tiling unit is assigned a particular set of raster tiles that do not overlap with raster tiles assigned to any other tiling unit. Therefore, each tiling unit operates based on the primitives received by the tiling unit, and not based on primitives received by other tiling units. A further advantage is that primitives are processed in cache tile order, which reduces memory bandwidth consumption and improves cache memory utilization.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A graphics subsystem, comprising:
a plurality of world-space pipelines, wherein each world-space pipeline is implemented within a different processing entity and is coupled to a different corresponding tiling unit in a plurality of tiling units; and
a plurality of screen-space pipelines, wherein each screen-space pipeline is implemented in a different processing entity and is coupled to a crossbar,
wherein each tiling unit is configured to receive primitives from the world-space pipeline corresponding to the tiling unit, aggregate the primitives into one or more cache tile batches, and transmit the one or more cache tile batches via the crossbar to one or more of the screen-space pipelines.

2. The graphics subsystem of claim 1, wherein a first tiling unit included in the plurality of tiling units is configured to determine that a resource count does not exceed a threshold and transmit a token to a second tiling unit included in the plurality of tiling units upon determining that the resource count does not exceed the threshold.

3. The graphics subsystem of claim 1, wherein a first tiling unit included in the plurality of tiling units is configured to determine that a resource count exceeds a threshold and transmit a flush signal to each of the other tiling units included in the plurality of tiling units upon determining that the resource count exceeds the threshold.

4. The graphics subsystem of claim 3, wherein:
the first tiling unit is further configured to:
determine that a first primitive and a second primitive overlap a first cache tile associated with a first cache tile batch;
include the first primitive and the second primitive in the first cache tile batch; and
transmit the first cache tile batch to the crossbar upon determining that the resource count exceeds the threshold or upon receiving a flush signal from another tiling unit included in the plurality of tiling units.

5. The graphics subsystem of claim 4, further comprising:
a first bounding box generator associated with the first tiling unit and configured to:
generate a first bounding box for the first primitive and a second bounding box for the second primitive; and
transmit both the first bounding box and the second bounding box to the first tiling unit.

6. The graphics subsystem of claim 5, wherein the first tiling unit is further configured to compare the first bounding box with a border associated with the first cache tile.

7. The graphics subsystem of claim 6, wherein the plurality of screen-space pipelines includes a first screen-space pipeline that is associated with a first set of raster tiles that includes one or more raster tiles that the first primitive overlaps and that are included in the first cache tile.

8. The graphics subsystem of claim 7, wherein the crossbar is configured to transmit the first primitive to the first screen-space pipeline.

9. The graphics subsystem of claim 1, further comprising a first screen-space work distribution crossbar that is associated with a first screen-space pipeline that is included in the plurality of screen-space pipelines and is configured to receive primitives from the crossbar, reorder the received primitives into application-programming-interface order on a cache tile basis, and transmit the primitives associated with a particular cache tile to the first screen-space pipeline for further processing.

10. A computing device, comprising:
a graphics subsystem, comprising:
a plurality of world-space pipelines, wherein each world-space pipeline is coupled to a tiling unit configured to receive primitives from the world-space pipeline; and
a plurality of screen-space pipelines, wherein each screen-space pipeline is coupled to a crossbar,
wherein each tiling unit is further configured to aggregate the primitives into one or more cache tile batches, and transmit the one or more cache tile batches via the crossbar to one or more of the screen-space pipelines.

11. The computing device of claim 10, wherein a first tiling unit included in the plurality of tiling units is configured to determine that a resource count does not exceed a threshold and transmit a token to a second tiling unit included in the plurality of tiling units upon determining that the resource count does not exceed the threshold.

12. The computing device of claim 11, wherein a first tiling unit included in the plurality of tiling units is configured to determine that a resource count exceeds a threshold and transmit a flush signal to each of the other tiling units included in the plurality of tiling units upon determining that the resource count exceeds the threshold.

13. The computing device of claim 12, wherein:
the first tiling unit is further configured to:
determine that a first primitive and a second primitive overlap a first cache tile associated with a first cache tile batch;

include the first primitive and the second primitive in the first cache tile batch; and transmit the first cache tile batch to the crossbar upon determining that the resource count exceeds the threshold or upon receiving a flush signal from another tiling unit included in the plurality of tiling units.

14. The computing device of claim 13, further comprising:

a first bounding box generator associated with the first tiling unit and configured to:
  generate a first bounding box for the first primitive and a second bounding box for the second primitive; and
  transmit both the first bounding box and the second box to the first tiling unit.

15. The computing device of claim 14, wherein the first tiling unit is further configured to compare the first bounding box with a border associated with the first cache tile.

16. The computing device of claim 15, wherein the plurality of screen-space pipelines includes a first screen-space pipeline that is associated with a first set of raster tiles that includes one or more raster tiles that the first primitive overlaps and that are included in the first cache tile.

17. The computing device of claim 16, wherein the crossbar is configured to transmit the first primitive to the first screen-space pipeline.

18. The computing device of claim 10, further comprising a first screen-space work distribution crossbar that is associated with a first screen-space pipeline that is included in the plurality of screen-space pipelines and is configured to receive primitives from the crossbar, reorder the received primitives into application-programming-interface order on a cache tile basis, and transmit the primitives associated with a particular cache tile to the first screen-space pipeline for further processing.

19. A method for performing distributed tiled caching, comprising:

receiving a plurality of primitives from a plurality of world-space pipelines wherein each world-space pipeline is associated with a different tiling unit included in a plurality of tiling units;

aggregating the primitives included in the plurality of primitives into one or more cache tile batches via the plurality of tiling units; and transmitting, via the plurality of tiling units, the one or more cache tile batches via a crossbar to one or more screen-space pipelines.

20. The method of claim 19, further comprising:

determining that a resource count associated with the plurality of primitives exceeds a threshold;

determining that a first primitive and a second primitive included in plurality of primitives overlap a first cache tile associated with a first cache tile batch;

including the first primitive and the second primitive in the first cache tile batch;

transmitting the first cache tile batch to a crossbar upon determining that the resource count exceeds the threshold; and transmitting a flush signal to each tiling unit included in the plurality of tiling units.

* * * * *